United States Patent
Brk

(10) Patent No.: US 11,073,181 B2
(45) Date of Patent: Jul. 27, 2021

(54) TRANSMISSION AND METHOD FOR SHIFTING A TRANSMISSION

(71) Applicant: Bayerische Motoren Werke Aktiengesellschaft, Munich (DE)

(72) Inventor: Nikola Brk, Munich (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 52 days.

(21) Appl. No.: 16/524,846

(22) Filed: Jul. 29, 2019

(65) Prior Publication Data

US 2019/0353211 A1 Nov. 21, 2019

Related U.S. Application Data

(63) Continuation of application No. PCT/EP2018/053146, filed on Feb. 8, 2018.

(30) Foreign Application Priority Data

Feb. 20, 2017 (DE) ...................... 10 2017 202 713.4

(51) Int. Cl.
*F16D 23/06* (2006.01)
*F16D 11/08* (2006.01)
(Continued)

(52) U.S. Cl.
CPC .............. *F16D 23/06* (2013.01); *F16D 11/08* (2013.01); *F16H 61/0403* (2013.01);
(Continued)

(58) Field of Classification Search
CPC ..... F16D 2063/0643; F16D 2023/0687; F16D 2023/0693; F16D 23/06; F16D 23/04;
(Continued)

(56) References Cited

U.S. PATENT DOCUMENTS 2,547,732 A 4/1951 Baker
3,286,801 A 11/1966 Wojcikowski
(Continued)

FOREIGN PATENT DOCUMENTS

CN 104251268 A 12/2014
DE 102 44 523 A1 4/2004
(Continued)

OTHER PUBLICATIONS

International Search Report (PCT/ISA/210) issued in PCT Application No. PCT/EP2018/053146 dated May 15, 2018 with English translation (six (6) pages).
(Continued)

*Primary Examiner* — Ernesto A Suarez
*Assistant Examiner* — Lillian T Nguyen
(74) *Attorney, Agent, or Firm* — Crowell & Moring LLP

(57) ABSTRACT

A transmission for a motor vehicle is provided. The transmission has a hydraulically or electrically operable gearshift sleeve, a clutch pack, an input shaft, and an output shaft, a gearshift sleeve, a gearshift sleeve claw, and an opposing output claw associated with the output shaft. The gearshift sleeve can be moved from an initial position into a first position, in which the gearshift sleeve transfers an axial force by way of the first ramp element and the second ramp element to the clutch pack for synchronization of the disks, and into a second position, in which the gearshift sleeve claw is connected to the output claw interlockingly in the direction of rotation and thus the input shaft and the output shaft are interlockingly coupled. A method for shifting such a transmission is also provided.

19 Claims, 1 Drawing Sheet

(51) Int. Cl.
*F16H 61/04* (2006.01)
*F16H 63/30* (2006.01)

(52) U.S. Cl.
CPC . *F16H 63/3069* (2013.01); *F16D 2023/0643* (2013.01); *F16H 2063/3096* (2013.01)

(58) Field of Classification Search
CPC ......... F16H 2063/3096; F16H 61/0403; F16H 63/3069; F16H 2023/0681
See application file for complete search history.

(56) References Cited

U.S. PATENT DOCUMENTS

| | | | |
|---|---|---|---|
| 4,413,715 | A | 11/1983 | Michael et al. |
| 7,384,366 | B2 | 6/2008 | Kelley, Jr. |
| 2004/0055844 | A1 | 3/2004 | Ebenhoch et al. |
| 2004/0198548 | A1 | 10/2004 | Showalter et al. |
| 2005/0202920 | A1 | 9/2005 | Kelley, Jr. |
| 2006/0163020 | A1* | 7/2006 | Schmidt .............. F16H 63/3026 192/53.1 |
| 2007/0084692 | A1 | 4/2007 | Fischer et al. |
| 2014/0374208 | A1 | 12/2014 | Heuver |

FOREIGN PATENT DOCUMENTS

| | | |
|---|---|---|
| DE | 10 2004 015 569 A1 | 10/2004 |
| DE | 20 2005 017 525 U1 | 3/2006 |
| DE | 10 2005 016 494 A1 | 10/2006 |
| DE | 10 2012 015 224 A1 | 5/2014 |
| JP | 59-131037 A | 7/1984 |

OTHER PUBLICATIONS

German-language Written Opinion (PCT/ISA/237) issued in PCT Application No. PCT/EP2018/053146 dated May 15, 2018 (six (6) pages).

German-language Search Report issued in counterpart German Application No. 10 2017 202 713.4 dated Sep. 28, 2017 with partial English translation (10 pages).

Chinese-language Office Action issued in Chinese Application No. 201880007201.0 dated Mar. 17, 2020 with English translation (16 pages).

* cited by examiner

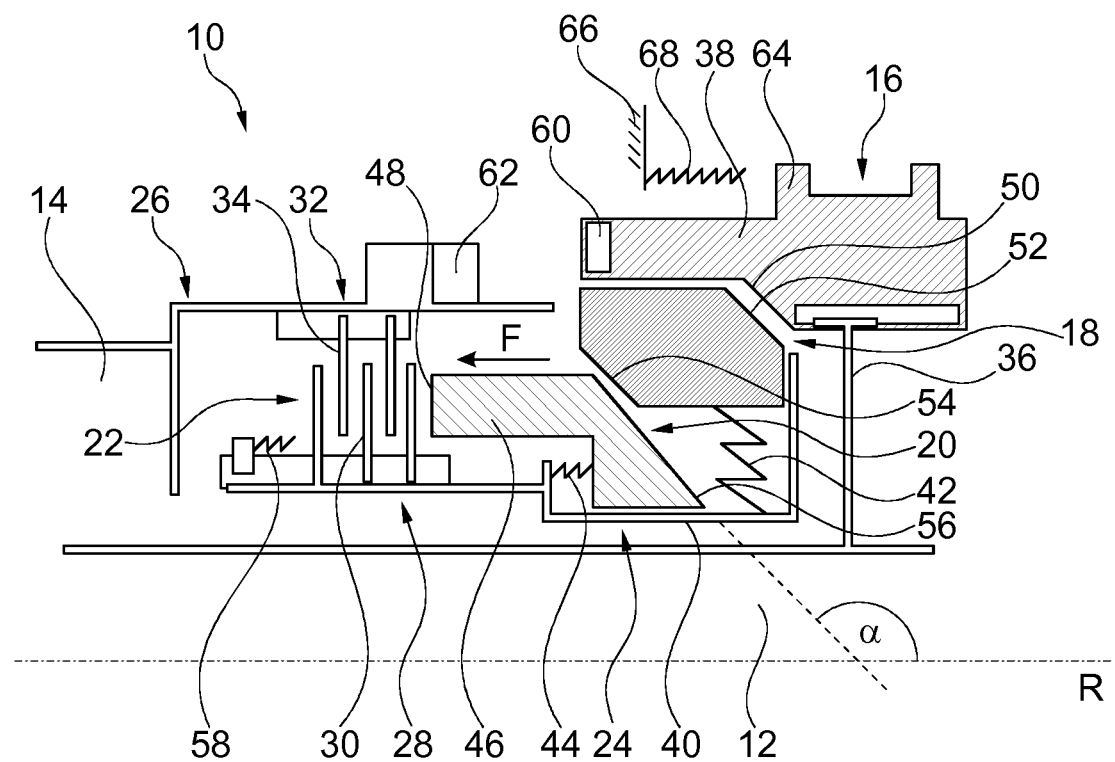

TRANSMISSION AND METHOD FOR SHIFTING A TRANSMISSION

CROSS REFERENCE TO RELATED APPLICATIONS

This application is a continuation of PCT International Application No. PCT/EP2018/053146, filed Feb. 8, 2018, which claims priority under 35 U.S.C. § 119 from German Patent Application No. 10 2017 202 713.4, filed Feb. 20, 2017, the entire disclosures of which are herein expressly incorporated by reference.

BACKGROUND AND SUMMARY OF THE INVENTION

The invention relates to a transmission, in particular for a motor vehicle, having a hydraulically or electrically operable gearshift sleeve, a clutch pack, an input shaft, and an output shaft, which are rotatably mounted about an axis of rotation, a first ramp element and a second ramp element, as well as a method for shifting such a transmission.

Transmissions, especially for motor vehicles, are known in the prior art and serve to provide a shiftable coupling between an input shaft and an output shaft for the transmission of torque. In practice, two concepts are chiefly relevant: frictional clutches and interlocking clutches. Frictional clutches, such as multi-plate clutches, have frictional linings, which are pressed against each other for the purpose of equalizing the rotational speed of input shaft and output shaft and for transmission of torque. Frictional clutches have the advantage that they can even be shifted under load. In order to safety transmit large torques in synchronism, however, constant high pressing forces are needed. Interlocking clutches, such as claw clutches, on the other hand, have latching elements, for example so-called claws, which interlock with each other and in this way can even transmit large torques, without it being necessary to apply a large axial force to the claws. The drawback of interlocking clutches, however, is that they are not load-shiftable, i.e., no torques can be transmitted during the shifting process.

A problem which the present invention proposes to solve is to provide a transmission which can be operated in both a load-shiftable and energy efficient manner in synchronism.

For the solution of the problem, a transmission is proposed, in particular for a motor vehicle, having a hydraulically or electrically operable gearshift sleeve, a clutch pack, an input shaft, and an output shaft, which are rotatably mounted about an axis of rotation, a first ramp element and a second ramp element, wherein the gearshift sleeve has a gearshift sleeve claw, and the output shaft has an output claw, which is arranged so as to lie opposite, wherein the gearshift sleeve can be moved from an initial position into a first position, in which the gearshift sleeve transfers an axial force by means of the first ramp element and the second ramp element to the clutch pack for synchronization of the disks, and into a second position in which the gearshift sleeve claw is connected to the output claw interlockingly in the direction of rotation and thus the input shaft and the output shaft are interlockingly coupled. The clutch pack has an open position in which the disks are substantially not frictionally interlocked, as well as a closed position in which the disks lie against one another. In the sense of the invention, the starting position is a position in which the transmission is not shifted to transmit torque, i.e., the gear is not engaged. The first position constitutes a region. Therefore, in particular, there are multiple positions of the transmission which count as the first position. The benefit of the transmission according to the invention is that, by way of the clutch pack, the rotary speed of the input shaft and the output shaft can be adapted under load, similar to a multi-plate clutch. Because after the speed adjustment the gearshift sleeve claw with the output claw produces an interlocking, torque-transmitting connection of the input shaft and the output shaft, no large pressing forces are required to hold the connection closed, whereby the energy consumption can be reduced. Thus, the transmission combines the advantage of load shifting of a multi-plate clutch with the advantage of a claw clutch to transmit even large torques in energy efficient manner.

The transmission may be designed such that the first and/or second ramp element in the second position exerts no axial force on the gearshift sleeve. This may be accomplished in particular in that the gearshift sleeve when moved from the first position to the second position displaces the first ramp element entirely from the travel path of the gearshift sleeve and thereby moves over the first ramp element. In this way, the force needed to hold the interlocking, torque-transmitting connection of the input shaft and the output shaft closed is reduced.

The clutch pack is preferably coupled to the input shaft and the output shaft such that the clutch pack when activated with an axial force couples the input shaft and the output shaft in torque transmission and speed synchronization. In this way, the rotary speeds of the input shaft and the output shaft can be equalized by an axial force under load.

In an intermediate position between the first position and the second position, the axial force on the clutch pack can be a maximum. This ensures that the maximum axial force acts on the clutch pack, at least for a section, before the transmission is moved to the second position. In particular, the intermediate position may directly adjoin the region of the first position, ensuring a seamless transition from the first position to the intermediate position.

It is advantageous for the first ramp element to be radially adjustably mounted, especially wherein the first ramp element in the first position is situated radially closer to the axis of rotation than in the initial position and wherein the first ramp element in the first position serves as an end stop for the gearshift sleeve and hinders its axial displacement to the second position. The end stop ensures that the first ramp element is only swiveled out relative to the axis of rotation before the gearshift sleeve can be moved into the second position. The first ramp element provides an end stop for the gearshift sleeve only in a particular region. Preferably, this region ends in the intermediate position, such that the end stop goes away as soon as a maximum force acts on the clutch pack. Moreover, the first ramp element can already serve as an end stop for the gearshift sleeve in the initial position.

Advantageously, the first and second ramp element are coupled in such a way that a radial shifting of the first ramp element results in an axial shifting of the second ramp element, especially a simultaneous shifting.

According to one advantageous embodiment, the first ramp element includes a first resetting element, which forces the first ramp element radially away from the axis of rotation into the initial position. This ensures that the first ramp element returns to the initial position when the force for the shifting of the first ramp element is less than the resetting force of the first resetting element or when this force is entirely absent.

The second ramp element may be axially adjustably mounted, in particular wherein the second ramp element in the first position bears axially against the clutch pack. In this way, the second ramp element is axially shiftable in order to activate the clutch pack with an axial force. The second ramp element moreover can bear axially against the clutch pack in the intermediate position and/or in the second position.

According to another advantageous embodiment, the second ramp element includes a second resetting element, which forces the second ramp element axially away from the clutch pack into the initial position. This ensures that the second ramp element returns to the initial position when the force for the shifting of the second ramp element is less than the resetting force of the second resetting element or when this force is entirely absent. In this way, the clutch pack is unloaded in the initial position and drag torques are reduced.

Preferably, the transmission has a third resetting element, which forces the clutch pack axially toward the second ramp element. The third resetting element provides a defined axial stiffness for the clutch pack. Moreover, the third resetting element can force the clutch pack into the open position in order to reduce drag torques when no activating force is present.

It is advantageous for the gearshift sleeve to be mounted axially movably on the input shaft, in particular wherein the gearshift sleeve is coupled to the first and second ramp element in such a way that a shifting of the gearshift sleeve into the first position results in a shifting of the first and second ramp elements into the first position. This ensures that an axial shifting of the gearshift sleeve into the first position results, in particular at the same time, in the displacement of the end stop in the form of the first ramp element, as well as the second ramp element transmitting an axial force to the clutch pack.

In one preferred embodiment, the transmission includes an axial end stop, against which the gearshift sleeve bears in the second position, and which includes in particular a fourth resetting element, which forces the gearshift sleeve axially into the initial position. Thanks to the axial end stop, the gearshift sleeve can be held in the second position with little force expended and with no costly position regulating system. The fourth resetting element ensures that the gearshift sleeve when no activating force is present is swiveled into the initial position, thereby ensuring the functional safety of the transmission.

The gearshift sleeve claw and/or the output claw may include a claw toothing, especially sliding teeth. In this way, an interlocking connection can be produced for the transmission of torque between the gearshift sleeve claw and the output claw in that the gearshift sleeve claw and the output claw can be pushed together in the axial direction, especially coaxially.

Preferably, the transmission is designed such that a displacement of the gearshift sleeve into the second position is basically only possible when the input shaft and output shaft are in synchronism. This ensures that the gearshift sleeve claw can only engage with the output claw when the speed difference between the input shaft and the output shaft is substantially zero, and it thereby prevents the transmission from being damaged when producing the interlocking connection.

In another preferred embodiment, the gearshift sleeve has a ramp surface on its radially inward side, which ramp surface can make contact with a ramp surface of the first ramp element, and/or the first ramp element has a ramp surface on its radially inward side, which ramp surface can make contact with a ramp surface of the second ramp element. The ramp surfaces have the advantage of having both an axial and a radial component, so that axial and radial forces can be transformed into one another. Thus, an axial movement of the gearshift sleeve by way of the ramp surface of the gearshift sleeve and the ramp surface of the first ramp element can be transformed into a radial movement of the first ramp element. Moreover, a radial movement of the first ramp element by way of the ramp surfaces on the first and second ramp element can result in an axial movement of the second ramp element.

The second ramp element may be designed such that it presses against the clutch pack during axial displacement, in order to bring the clutch pack into the closed position. In this way, the second ramp element can close the clutch pack in order to bring the input shaft and the output shaft into synchronism, especially when the gearshift sleeve is in the first position and/or the intermediate position and/or the second position.

According to the invention, a method for shifting a transmission according to the invention is also proposed to solve the above stated problem, having the following steps:

a) equalizing the rotary speeds of the input shaft and the output shaft in that the first and the second ramp elements are moved into the first position by axial displacement of the gearshift sleeve into the first position, and b) movement of the gearshift sleeve into the second position while the input shaft and the output shaft are in synchronism, in which the gearshift sleeve claw is connected in an interlocking manner to the output claw in the direction of rotation.

Other objects, advantages and novel features of the present invention will become apparent from the following detailed description of one or more preferred embodiments when considered in conjunction with the accompanying drawings.

BRIEF DESCRIPTION OF THE DRAWING

FIG. 1 is a schematic sectional view of a transmission according to an embodiment of the invention.

DETAILED DESCRIPTION OF THE DRAWING

FIG. 1 shows in a sectional view a transmission 10 according to an embodiment of the invention in the initial position. Each component of the transmission 10 may be ring shaped and is preferably rotationally symmetrical at least for a portion.

The transmission 10 includes an input shaft 12 and an output shaft 14, which are rotatably mounted about a common axis of rotation R. The transmission 10 further includes a gearshift sleeve 16, a first ramp element 18 and a second ramp element 20, a clutch pack 22, as well as an inner gear ring 24 and an outer gear ring 26. The first ramp element 18 does not extend continuously about the circumference of the axis of rotation R, but instead is a part segmented circumferentially. In particular, several mutually spaced first ramp elements 18 are arranged along the circumference of the second ramp element 20. The second ramp element 20, in contrast, is a ring.

The inner gear ring 24 is connected to the input shaft 12 in a rotationally fixed and axially immovable manner. The outer gear ring 26 is connected to the output shaft 14 in a rotationally fixed and axially immovable manner.

The inner gear ring 24 is situated closer to the axis of rotation R in the radial direction than the outer gear ring 26.

The clutch pack 22 is situated between the inner gear ring 24 and the outer gear ring 26 in the radial direction and it connects the inner gear ring 24 to the outer gear ring 26.

The clutch pack 22 includes a first disk carrier 28, a plurality of first disks 30 which are connected to the first disk carrier 28 in a rotationally fixed and axially immovable manner, a second disk carrier 32, which is axially movable with respect to the first disk carrier 28, a plurality of second disks 34 which are connected to the second disk carrier 32 in a rotationally fixed and axially immovable manner and which form with the first disks 30 a multi-plate clutch. The first disk carrier 28 is secured to the inner gear ring 24 or a portion thereof and the second disk carrier 32 is secured to the outer gear ring 26 or a portion thereof. In this way, the input shaft 12 and the output shaft 14 can be coupled by the clutch pack 22 in a torque-transmitting manner.

The gearshift sleeve 16 is a hydraulically or electrically operable gearshift sleeve.

Via a gearshift sleeve carrier 36, the gearshift sleeve 16 is connected to the input shaft 12 in a rotationally fixed manner and mounted axially movably with respect to it.

The gearshift sleeve 16 has a section 38 which is situated opposite the outer gear ring 26 in the axial direction. The section 38 is further removed from the axis of rotation R in the radial direction than the inner gear ring 24, wherein a bearing section 40 of the inner gear ring 24 is situated at least partly in the radial direction between the section 38 and the input shaft 12.

The first ramp element 18 is situated in the radial direction between the section 38 and the inner gear ring 24 and is mounted on the bearing section 40 in a radially movable and axially immovable manner. In the initial position, the first ramp element 18 is situated at least partly in the axial direction between the gearshift sleeve 16 and the outer gear ring 26, the first ramp element 18 thereby forming an end stop in the axial direction for the gearshift sleeve 16. A first resetting element 42 is situated in the radial direction between the bearing section 40 and the first ramp element 18 and it forces the first ramp element 18 radially away from the axis of rotation R into the initial position.

The second ramp element 20 is mounted axially movably on the bearing section 40. In the initial position, the second ramp element 20 is situated at least partly between the first ramp element 18 and the inner gear ring 24 in the radial direction, whereby the second ramp element 20 forms an end stop for the first ramp element 18 in the radial direction.

A second resetting element 44 is situated in the axial direction between the clutch pack 22 and the second ramp element 20, more precisely between an offset of the bearing section 40 and the second ramp element 20, and it forces the second ramp element 20 axially away from the clutch pack 22 into the initial position.

The second ramp element 20 has an activating section 46 with an axial end 48 which is situated in the axial direction opposite the clutch pack 22.

The gearshift sleeve 16 has a first ramp surface 50 on its radial inward side, which ramp surface lies opposite the outer gear ring 26 for at least a portion in the axial direction and is provided between the section 38 and the gearshift sleeve carrier 36.

The first ramp element 18 has a second ramp surface 52 on its radially outward side, which is situated at least partly opposite the first ramp surface 50 in the axial direction and is inclined the same as the ramp surface 50. Moreover, on its radially inward side the first ramp element 18 has a third ramp surface 54, which lies at least partly opposite the outer gear ring 26 in the axial direction.

The second ramp element 20 has a fourth ramp surface 56 on its radially outward side, which ramp surface is situated opposite the third ramp surface 54 for at least a portion in the radial direction and is inclined the same as this.

The fourth ramp surface 56 is situated axially opposite to the axial end 48 of the activation section 46.

The ramp surfaces 50, 52, 54, 56 are cones and have an angle $\alpha$ of 135° with respect to the axis of rotation R. Alternatively, the angle $\alpha$ may be between 90° and 180°. Preferably, the angle $\alpha$ is between 120° and 150°, in order to transform axial forces into roughly equal radial forces and vice versa. In an alternative embodiment, the ramp surfaces 50, 52, 54, 56 may have angles $\alpha$ differing from each other.

The first ramp surface 50 in the initial position may bear against the second ramp surface 52 and the third ramp surface 54 may bear against or be slightly spaced apart from the fourth ramp surface 56.

By way of the ramp surfaces 50, 52, 54, 56, the gearshift sleeve 16, the first ramp element 18 and the second ramp element 20 are coupled in such a way that an axial displacement of the gearshift sleeve 16 in the direction of the outer gear ring 26 results in an axial displacement of the second ramp element 20. In this way, the axial end 48 of the second ramp element 20 applies an axial force F to the clutch pack 22, resulting in a closing of the clutch pack 22 and thus a synchronization of the input shaft 12 with the output shaft 14.

Opposite the activation section 46 there is arranged a third resetting element 58 on the clutch pack 22, which forces the clutch pack 22 axially in the direction of the second ramp element 20 and provides a defined axial stiffness for the clutch pack 22.

The third resetting element 58 forces the clutch pack 22 into the opened position, so that the clutch pack 22 opens without an axial force F applied, thereby reducing drag torques.

The gearshift sleeve 16 has a gearshift sleeve claw 60 at the axial end of the section 38 which is facing toward the outer gear ring 26. Axially opposite the gearshift sleeve claw 60, the outer gear ring 26 has an output claw 62, with which the gearshift sleeve claw 60 can engage when the gearshift sleeve 16 is moved from the initial position axially toward the outer gear ring 26. When the gearshift sleeve claw 60 is in engagement with the output claw 62, the input shaft 12 and the output shaft 14 are joined interlocking in the direction of rotation, whereby large torques can be transmitted in an energy-efficient manner.

The gearshift sleeve claw 60 and the output claw 62 have a claw toothing, for example in the form of sliding teeth.

The gearshift sleeve 16 on its radially outward side includes a gearshift sleeve stop 64, which protrudes radially and bears against an axial stop 66 when the gearshift sleeve claw 60 is in engagement with the output claw 62.

The axial stop 66 includes a fourth resetting element 68, which forces the gearshift sleeve 16 into the initial position and in this way ensures the functional safety of the transmission 10.

At least one portion of the resetting elements 42, 44, 58, 68 can be spring elements.

The transmission 10 can be moved from the indicated initial position into a first position, in which the gearshift sleeve 16 is moved axially in the direction of the output shaft 14 as compared to the initial position, although the gearshift sleeve claw 60 and the output claw 62 are not in engagement. Because the gearshift sleeve 16 is situated overlapping with the first ramp element 18 in the axial direction and the first ramp element 18 is situated overlapping with the second ramp element 20 in the radial direction, the first ramp element 18 in the first position forms an axial stop for the gearshift sleeve 16 and the second ramp element 20 forms a radial stop for the first ramp element 18. Thanks to the ramp surfaces 50, 52, 54, 56 and the mounting of the ramp elements 18, 20, the gearshift sleeve 16 and the ramp elements 18, 20 are coupled together in such a way that an axial displacement of the gearshift sleeve 16 results in a radial displacement of the first ramp element 18 and a radial displacement of the first ramp element 18 results in an axial displacement of the second ramp element 20. In this way, in the first position the first ramp element 18 is situated closer to the axis of rotation R in the radial direction and the second ramp element 20 lies against the clutch pack 22 in the first position. In this way, in the first position, the axial force F is transmitted from the gearshift sleeve 16 across the ramp elements 18, 20 to the clutch pack 22, resulting in synchronization of the disks 30, 34.

The gearshift sleeve 16 can be moved from the first position into a second position in which the gearshift sleeve 16 has been moved axially further in the direction of the output shaft 14 as compared to the first position and the gearshift sleeve claw 60 and the output claw 62 are engaging interlockingly. Thus, in the second position, the gearshift sleeve claw 60 and the output claw 62 are joined interlocking in the circumferential direction and thus the input shaft 12 is coupled interlocking and torque-transmitting to the output shaft 14.

The gearshift sleeve 16 cannot be moved directly from the initial position into the second position, i.e., a moving of the gearshift sleeve 16 into the second position is only possible via the first position. Because the first ramp element 18 in the first position forms a stop for the gearshift sleeve 16, it is ensured that the moving of the gearshift sleeve 16 into the second position first automatically results in the closing of the clutch pack 22 and thus an adapting of the rotary speeds of input shaft 12 and output shaft 14.

In the second position, the gearshift sleeve 16 lies against the axial stop 66 with the gearshift sleeve stop 64.

In an intermediate position between the first and the second position, the axial force F applied by the second ramp element 20 to the clutch pack 22 is a maximum. Alternatively or additionally, the maximum axial force F may act in the first position.

In the second position, the clutch pack 22 is further subjected to the axial force F by the second ramp element 20 and held closed. Alternatively, after the gearshift sleeve claw 60 is joined interlockingly to the output claw 62, no axial force F can act on the clutch pack 22, so that the clutch pack 22 is in the open position.

In the second position, the maximum axial force F can act on the clutch pack 22.

The gearshift sleeve 16 is coupled to the first ramp element 18 in such a way that the first ramp element 18 during the axial displacement of the gearshift sleeve 16 is moved so far that after a predetermined position the first ramp element 18 no longer forms a stop for the gearshift sleeve 16 and the gearshift sleeve 16 can be moved into the second position. This predetermined position is preferably the intermediate position.

The transmission 10 may include an axial blocked position, which allows the movement of the gearshift sleeve 16 into the second position basically only when the input shaft 12 and the output shaft 14 are in synchronism.

In order to shift the transmission 10 from the opened initial position to the closed second position, in which the input shaft 12 and the output shaft 14 are coupled interlocking and torque-transmitting, the following steps are performed:

In a first step, the gearshift sleeve 16 is moved axially into a first position in the direction of the output shaft 14. Because the first ramp element 18 is located in the displacement path of the gearshift sleeve 16 and thus forms an axial stop, the first ramp element 18 is likewise moved radially into the first position by the ramp surfaces 50, 52. Since the first ramp element 18 is coupled to the second ramp element 20 across the ramp surfaces 54, 56, the second ramp element 20 will also be moved into the first position, in which it bears against the clutch pack 22 and applies an axial force F to it. The axial force F results in the closing of the clutch pack 22, whereby the rotary speeds of the input shaft 12 and the output shaft 14 are matched to each other.

In a following second step, the gearshift sleeve 16 is moved further in the direction of the output shaft 14, until it reaches the intermediate position in which the axial force F acting on the clutch pack 22 is a maximum.

Thanks to the ramp surfaces 50, 52, the axial force F increases, especially in a linear manner, when the gearshift sleeve 16 is moved from the initial position through the first position into the intermediate position.

Once the input shaft 12 and the output shaft 14 have been synchronized, in a third step the gearshift sleeve 16 is then moved into the second position in which the gearshift sleeve claw 60 is joined to the output claw 62 in an interlocking manner in the direction of rotation. Alternatively, it may be provided that the gearshift sleeve claw 60 and the output claw 62 are automatically moved from an axial blocking position to the second position when the input shaft 12 and the output shaft 14 are in synchronism.

In order to shift the transmission 10 from the closed second position to the opened initial position, the following steps are performed: in a first step, the gearshift sleeve 16 is moved axially away from the output shaft 14 from the second position to the intermediate position. The interlocking connection of the gearshift sleeve claw 60 and the output claw 62 is hereby opened and a maximum axial force F is acting on the clutch pack 22.

In a following second step, the gearshift sleeve 16 is moved axially away from the output shaft 14 through the first position to the initial position. The ramp surfaces 50, 52 ensure that the first ramp element 18 is moved radially and the second ramp element 20 is moved axially from the first position to the initial position during the displacement of the gearshift sleeve 16. The axial force F acting on the clutch pack 22 decreases, especially in a linear manner, and finally results in the opening of the clutch pack 22, whereby the rotary speeds of the input shaft 12 and the output shaft 14 are no longer synchronized.

The transmission 10 according to the invention has the advantage that it is load-shiftable thanks to the clutch pack 22 and it can transmit large torques thanks to the interlocking coupling of the gearshift sleeve claw 60 to the output claw 62. Moreover, at most slight forces are needed to hold the claws 60, 62 in engagement, since the gearshift sleeve 16 can rest against the axial stop 66. Hence, the transmission 10 can be operated with great energy efficiency in synchronism. Moreover, it is advantageous that the transmission 10 according to the invention can be shifted without interrupting the torque transmission, since the clutch pack 22 remains closed until at least the input shaft 12 and the output shaft 14 are coupled in an interlocking and torque-transmitting manner through the claws 60, 62. Also upon opening the transmission 10, when the gearshift sleeve 16 is moved from the second position via the intermediate position and the first position into the initial position, an axial force F acts in the intermediate position and in the first position on the clutch pack 22, so that the input shaft 12 and the output shaft 14 are coupled in a torque-transmitting manner in these positions.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A transmission, comprising:
    a hydraulically or electrically operable gearshift sleeve;
    a clutch pack;
    an input shaft;
    an output shaft which is rotatably mounted about an axis of rotation;
    a first ramp element; and
    a second ramp element,
    wherein
        the gearshift sleeve has a gearshift sleeve claw, the output shaft has an output claw, which is arranged so as to lie opposite the gearshift sleeve,
        the input shaft and the output shaft are concentrically arranged with the input shaft being at least partially radially within the output shaft,
        the gearshift sleeve is movable axially in a direction parallel to the axis of rotation from an initial position into a first position in which the gearshift sleeve transfers an axial force by way of the first ramp element and the second ramp element to the clutch pack for synchronization of disks of the clutch pack while remaining disconnected from the output sleeve, and
        the gearshift sleeve is movable axially further in the same direction parallel to the axis of rotation into a second position in which the gearshift sleeve claw is connected to the output claw interlockingly in a direction of rotation and thus the input shaft and the output shaft are interlockingly coupled.

2. The transmission according to claim 1, wherein
    the clutch pack is coupled to the input shaft and the output shaft such that the clutch pack when activated with the axial force couples the input shaft and the output shaft in torque transmission and speed synchronization.

3. The transmission according to claim 2, wherein in an intermediate position between the first position and the second position, the axial force on the clutch pack is a maximum.

4. The transmission according to claim 1, wherein in an intermediate position between the first position and the second position, the axial force on the clutch pack is a maximum.

5. The transmission according to claim 1, wherein
    the first ramp element in the first position is situated radially closer to the axis of rotation than in the initial position, and
    the first ramp element in the first position serves as an end stop for the gearshift sleeve and hinders its axial displacement to the second position.

6. The transmission according to claim 1, wherein the first and second ramp elements are coupled in such a way that a radial shifting of the first ramp element results in an axial shifting of the second ramp element.

7. The transmission according to claim 1, wherein the first ramp element comprises a first resetting element, which forces the first ramp element radially away from the axis of rotation into the initial position.

8. The transmission according to claim 1, wherein the second ramp element is axially adjustably mounted.

9. The transmission according to claim 8, wherein the second ramp element in the first position bears axially against the clutch pack.

10. The transmission according to claim 1, wherein
    the second ramp element comprises a second resetting element, which forces the second ramp element axially away from the clutch pack into the initial position, and/or
    the transmission has a third resetting element, which forces the clutch pack axially toward the second ramp element.

11. The transmission according to claim 1, wherein the gearshift sleeve is mounted axially movably on the input shaft.

12. The transmission according to claim 11, wherein
    the gearshift sleeve is coupled to the first and second ramp element in such a way that a shifting of the gearshift sleeve into the first position results in a shifting of the first and second ramp elements into the first position.

13. The transmission according to claim 1, wherein
    the transmission comprises an axial end stop, against which the gearshift sleeve bears in the second position, and which comprises a fourth resetting element, which forces the gearshift sleeve axially into the initial position.

14. The transmission according to claim 1, wherein the gearshift sleeve claw and/or the output claw comprises claw toothing.

15. The transmission according to claim 14, wherein the claw toothing is in a form of sliding teeth.

16. The transmission according to claim 1, wherein
    the transmission is designed such that a displacement of the gearshift sleeve into the second position is only possible when the input shaft and the output shaft are in synchronism.

17. The transmission according to claim 1, wherein
    the gearshift sleeve has a ramp surface on its radially inward side, which ramp surface can make contact with a ramp surface of the first ramp element, and/or
    the first ramp element has a ramp surface on its radially inward side, which ramp surface can make contact with a ramp surface of the second ramp element.

18. The transmission according to claim 1, wherein the second ramp element is designed such that it presses against the clutch pack during axial displacement in order to bring the clutch pack into a closed position.

19. A method for shifting a transmission according to claim 1, the method comprising the acts of:
    equalizing rotary speeds of the input shaft and the output shaft in that the first and second ramp elements are moved into the first position by axial displacement of the gearshift sleeve into the first position; and
    moving the gearshift sleeve into the second position while the input shaft and the output shaft are in synchronism, in which the gearshift sleeve claw is connected in an interlocking manner to the output claw in the direction of rotation.

* * * * *